United States Patent
Cohen et al.

(10) Patent No.: US 10,311,593 B2
(45) Date of Patent: Jun. 4, 2019

(54) OBJECT INSTANCE IDENTIFICATION USING THREE-DIMENSIONAL SPATIAL CONFIGURATION

(71) Applicant: International Business Machines Corporation, Armonk, NY (US)

(72) Inventors: Benjamin M Cohen, Gilon (IL); Asaf Tzadok, Nesher (IL); Yochay Tzur, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 104 days.

(21) Appl. No.: 15/352,586

(22) Filed: Nov. 16, 2016

(65) Prior Publication Data

US 2018/0137386 A1    May 17, 2018

(51) Int. Cl.
| | |
|---|---|
| *G06T 7/70* | (2017.01) |
| *H04N 7/18* | (2006.01) |
| *G02B 27/01* | (2006.01) |
| *G06K 9/00* | (2006.01) |
| *G06K 9/62* | (2006.01) |

(52) U.S. Cl.
CPC .............. *G06T 7/70* (2017.01); *G02B 27/017* (2013.01); *G06K 9/00201* (2013.01); *G06K 9/6226* (2013.01); *H04N 7/185* (2013.01); *G02B 2027/014* (2013.01); *G02B 2027/0138* (2013.01); *G02B 2027/0141* (2013.01)

(58) Field of Classification Search
None
See application file for complete search history.

(56) References Cited

U.S. PATENT DOCUMENTS

| | | | |
|---|---|---|---|
| 7,343,278 B2 * | 3/2008 | Billinghurst | G06K 9/32 |
| | | | 345/420 |
| 7,840,032 B2 * | 11/2010 | Ofek | G06T 3/4038 |
| | | | 345/629 |

(Continued)

FOREIGN PATENT DOCUMENTS

WO    2013120041    8/2013

OTHER PUBLICATIONS

Chua, Chin Seng, and Ray Jarvis. "Point signatures: A new representation for 3d object recognition." International Journal of Computer Vision 25.1 (1997): 63-85. (Year: 1997).*

*Primary Examiner* — Michelle M Entezari
(74) *Attorney, Agent, or Firm* — Dvir Gassner

(57) ABSTRACT

A system for identifying specific instances of objects in a three-dimensional (3D) scene, comprising: a camera for capturing an image of multiple objects at a site; at least one processor executable to: use a location and orientation of the camera to create a 3D model of the site including multiple instances of objects expected to be in proximity to the camera, and generate multiple candidate clusters each representing a different projection of the 3D model, detect at least two objects in the image, and determine a spatial configuration for each detected object; and match the detected image objects to one of the multiple candidate cluster using the spatial configurations, associate the detected objects with the expected object instances of the matched cluster, and retrieve information of one of the detected objects that is stored with the associated expected object instance; and a head-wearable display configured to display the information.

16 Claims, 12 Drawing Sheets

(56) References Cited

U.S. PATENT DOCUMENTS

| | | | |
|---|---|---|---|
| 7,929,775 B2* | 4/2011 | Hager | G06K 9/00208 |
| | | | 382/154 |
| 8,718,362 B2 | 5/2014 | Tuzel et al. | |
| 9,189,886 B2* | 11/2015 | Black | G06K 9/00369 |
| 9,292,764 B2* | 3/2016 | Yun | G06K 9/6201 |
| 9,542,773 B2* | 1/2017 | Pan | G06T 17/00 |
| 2005/0286767 A1 | 12/2005 | Hager et al. | |
| 2009/0060259 A1* | 3/2009 | Goncalves | A47F 9/047 |
| | | | 382/100 |
| 2012/0330447 A1* | 12/2012 | Gerlach | G01B 11/24 |
| | | | 700/95 |
| 2013/0222369 A1* | 8/2013 | Huston | G06T 17/00 |
| | | | 345/419 |
| 2013/0286161 A1* | 10/2013 | Lv | G06K 9/00214 |
| | | | 348/46 |
| 2014/0225985 A1* | 8/2014 | Klusza | H04N 13/0207 |
| | | | 348/43 |
| 2014/0270382 A1* | 9/2014 | Cheng | G06K 9/00355 |
| | | | 382/104 |
| 2014/0279790 A1 | 9/2014 | Ramachandran et al. | |
| 2015/0003723 A1* | 1/2015 | Huang | G06K 9/6212 |
| | | | 382/154 |
| 2015/0016712 A1* | 1/2015 | Rhoads | G06K 9/00208 |
| | | | 382/154 |
| 2015/0138385 A1* | 5/2015 | Kim | H04N 5/23216 |
| | | | 348/211.99 |
| 2017/0090196 A1* | 3/2017 | Hendron | G06T 11/00 |
| 2017/0151943 A1* | 6/2017 | Goto | B60W 30/09 |
| 2017/0154204 A1* | 6/2017 | Ryu | G06K 9/00208 |

* cited by examiner

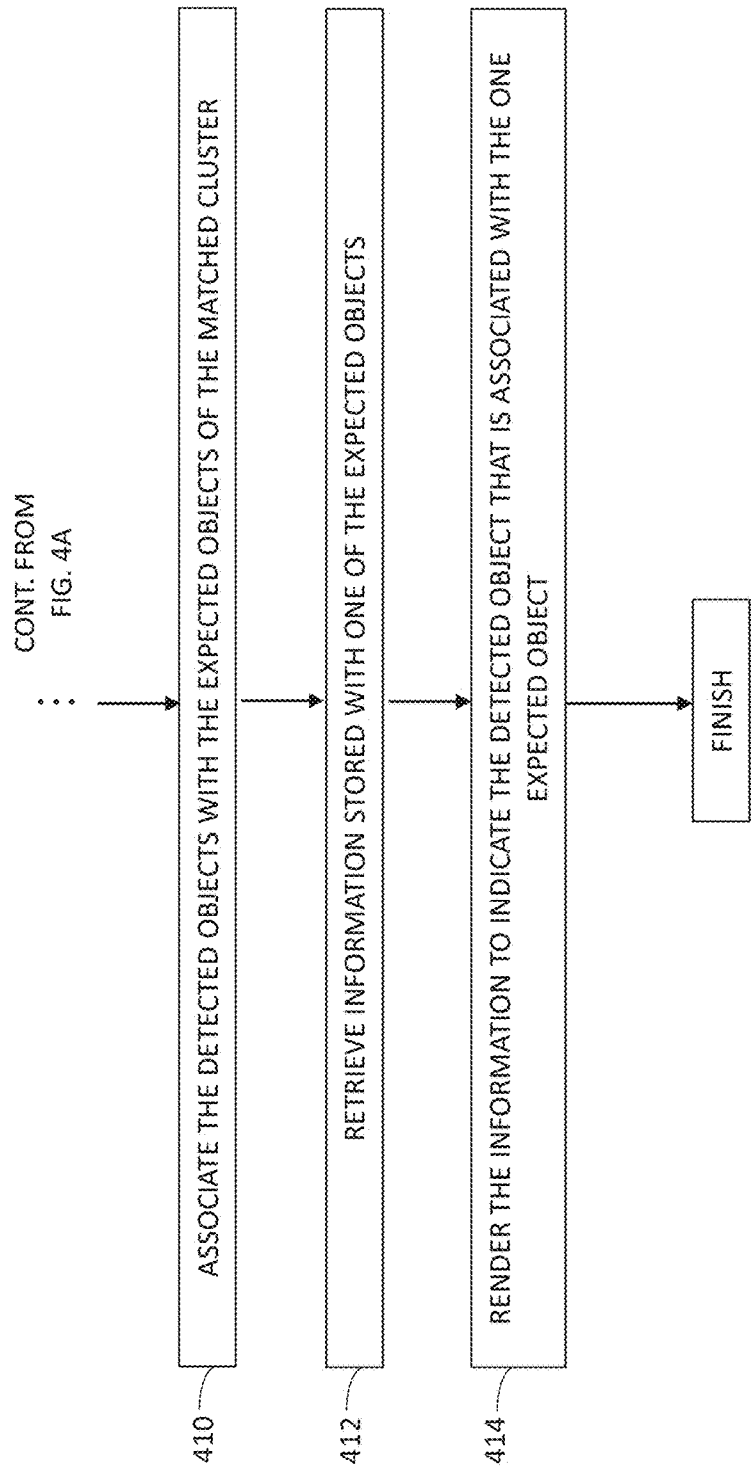

OBJECT INSTANCE IDENTIFICATION USING THREE-DIMENSIONAL SPATIAL CONFIGURATION

BACKGROUND

The invention relates to the field of three-dimensional object recognition.

Complex industrial settings often have many installations of similar instruments, such that identifying a particular instance of an instrument for servicing, maintenance or repair can prove challenging. Although visual markers, such as barcodes, QR codes, or RFID tags allow uniquely identifying different instruments in such settings, these solutions are often impractical in a large and complex setting due to the significant overhead required to install numerous tags. Moreover, harsh industrial environments can cause these tags to fade or corrode, requiring their regular replacement and maintenance, adding to the cost of implementing such systems.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided in accordance with an embodiment, a system for identifying objects' instances in a three-dimensional (3D) scene, comprising: a camera configured to capture an image of multiple objects at a site; at least one hardware processor; a non-transitory memory device having embodied thereon program code executable by said at least one hardware processor to: use a location and orientation of the camera to create a 3D model of the site including multiple instances of objects expected to be in proximity to the camera, and generate multiple candidate clusters each representing a different projection of the 3D model, detect at least two objects in the image, and determine a spatial configuration for each detected object; and match the detected image objects to one of the multiple candidate cluster using the spatial configurations, associate the detected objects with the expected object instances of the matched cluster, and retrieve information of one of the detected objects, wherein the information is stored with the associated expected object instance; and a head-wearable display configured to display the retrieved information.

In some embodiments, the head-wearable display is selected from the group consisting of: an augmented reality display, and a virtual reality display.

In some embodiments, one of the at least one hardware processors is disposed with the head-wearable display.

In some embodiments, the camera is disposed with the head-wearable display.

In some embodiments, the system further comprises position and orientation componentry disposed in a same housing with the camera and selected from the group consisting of: a global positioning system (GPS), and a compass, wherein the at last one hardware processor is further configured to receive the location and orientation of the camera from the position and orientation componentry.

In some embodiments, the program code is further executable to: create the 3D model by identifying each expected object instance according to its spatial configuration relative to an absolute viewing area of the camera with respect to a global coordinate system, wherein the absolute viewing area of the camera is determined using the location and orientation of the camera, match the detected image objects in accordance with a minimal estimated 3D transformation error between the spatial configurations of the detected objects relative to a coordinate system of the camera and the spatial configurations of the expected object instances relative to the global coordinate system, wherein the spatial configuration comprises an orientation and an estimated 3D position for each detected object and each expected object instance, and a spatial distance between any two of the detected object and between any two of the expected object instances.

In some embodiments, the system further comprises a user interface is configured to receive a selection of one of the detected objects, wherein the displayed information is associated with the selected object instance.

There is provided, in accordance with an embodiment, a method for identifying multiple object instances, comprising: capturing, by a camera, an image of multiple objects at a site; using the location and orientation of the camera to create a three dimensional (3D) model of the site including multiple instances of objects expected to be in proximity to the camera; generating multiple candidate clusters each representing a different projection of the 3D model; detecting at least two objects in the image; determining a spatial configuration for each detected object; matching the detected image objects to one of the candidate clusters using the spatial configurations; associating the detected objects with the expected object instances of the matched cluster; and retrieving information stored with one of the expected object instances.

In some embodiments, the method further comprises rendering the retrieved information to indicate the detected object that is associated with the one of the expected object instances.

In some embodiments, the method further comprises using the matched cluster to refine the detection of the object in the image and correct a detection error selected from the group consisting of: a missed detection, and a false positive detection.

In some embodiments, the method further comprises receiving a selection of one of the detected objects, wherein the retrieved information is associated with the selected object instance.

There is provided, in accordance with an embodiment, a computer program product comprising a non-transitory computer-readable storage medium having program code embodied thereon, the program code executable by at least one hardware processor to: receive an image captured by a camera of multiple objects at a site; use a location and orientation of the camera to create a three dimensional (3D) model of the site including multiple instances of objects expected to be proximity to the camera; generate multiple candidate clusters each representing a different projection of the 3D model; detect at least two objects in the image; determine a spatial configuration for each detected object; match the detected image objects to one of the candidate clusters using the spatial configurations; associate the detected objects with the expected object instances of the matched cluster; and retrieve information stored in association with one of the expected object instances.

In some embodiments, the program code is further executable to render the information to indicate the detected object that is associated with the one of the expected object instances.

In some embodiments, the camera location and orientation are measurements selected from the group consisting of: a global positioning system (GPS) measurement, and a compass measurement.

In some embodiments, creating the 3D model comprises identifying each expected object instance according to its spatial configuration relative to an absolute viewing area of the camera with respect to a global coordinate system, wherein the absolute viewing area of the camera is determined using the location and orientation of the camera, and wherein matching the detected image objects comprises matching object instances in accordance with a minimal estimated 3D transformation error between the spatial configurations of the detected objects relative to a coordinate system of the camera and the spatial configurations of the expected object instances relative to the global coordinate system, wherein the spatial configuration comprises an orientation and an estimated 3D position for each detected object and each expected object instance, and a spatial distance between any two of the detected objects and between any two of the expected object instances.

In some embodiments, the program code is further executable to use the matched cluster to refine the detection of the objects in the image and correct a detection error selected from the group consisting of: a missed detection, and a false positive detection.

In some embodiments, the program code is further executable to receive a selection of one of the detected objects, wherein the displayed information is associated with the selected object instance.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIGS. 4A-4B, taken together, show a flowchart of a method for recognizing an object according to its three dimensional (3D) spatial configuration, in accordance with an embodiment.

DETAILED DESCRIPTION

A method, a system and a computer program product are disclosed herein to identify each of multiple objects positioned in proximity to each other. A camera captures an image of multiple objects. The spatial configurations of the objects with respect to each other and with respect to the camera are used to identify the object instances by matching their three dimensional (3D) spatial configuration, as determined from the image, with the spatial configurations of objects known, or expected to be positioned in the general location of the camera.

Figure 1A:
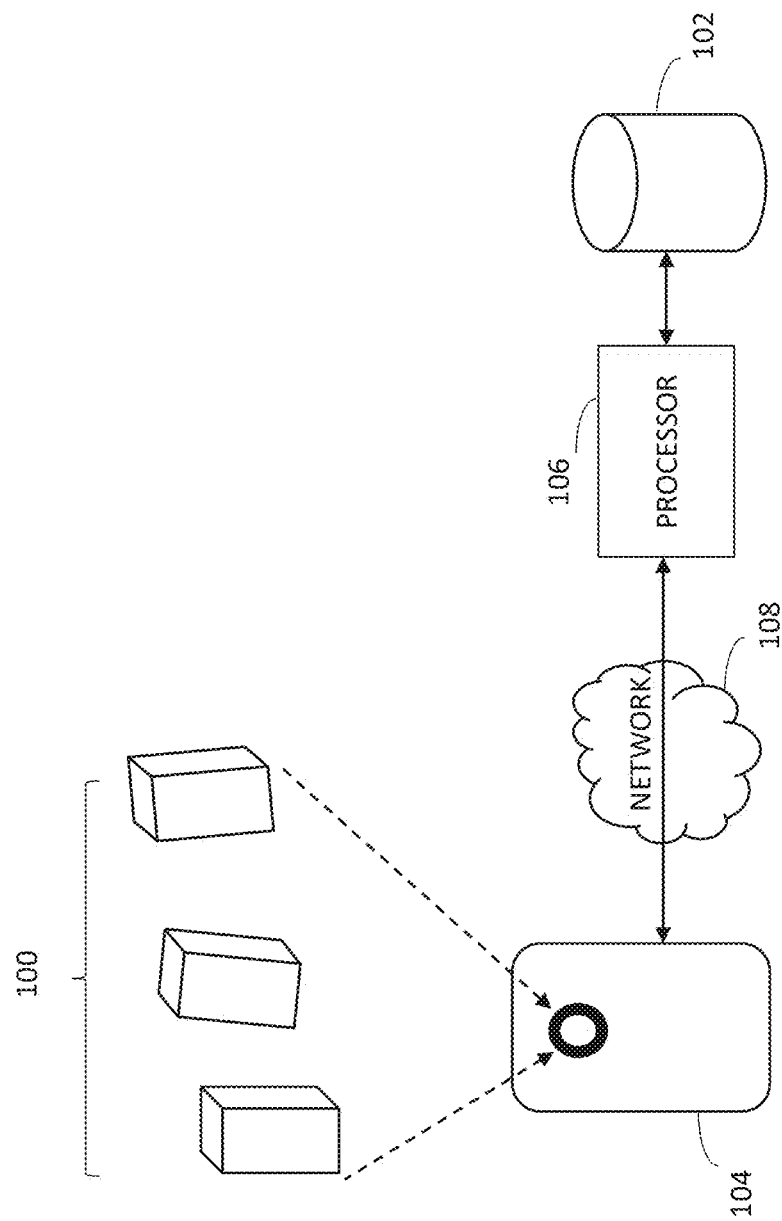
FIGS. 1A-1C show a system for identifying multiple objects in a three-dimensional scene, in accordance with an embodiment.
Figure 1B:
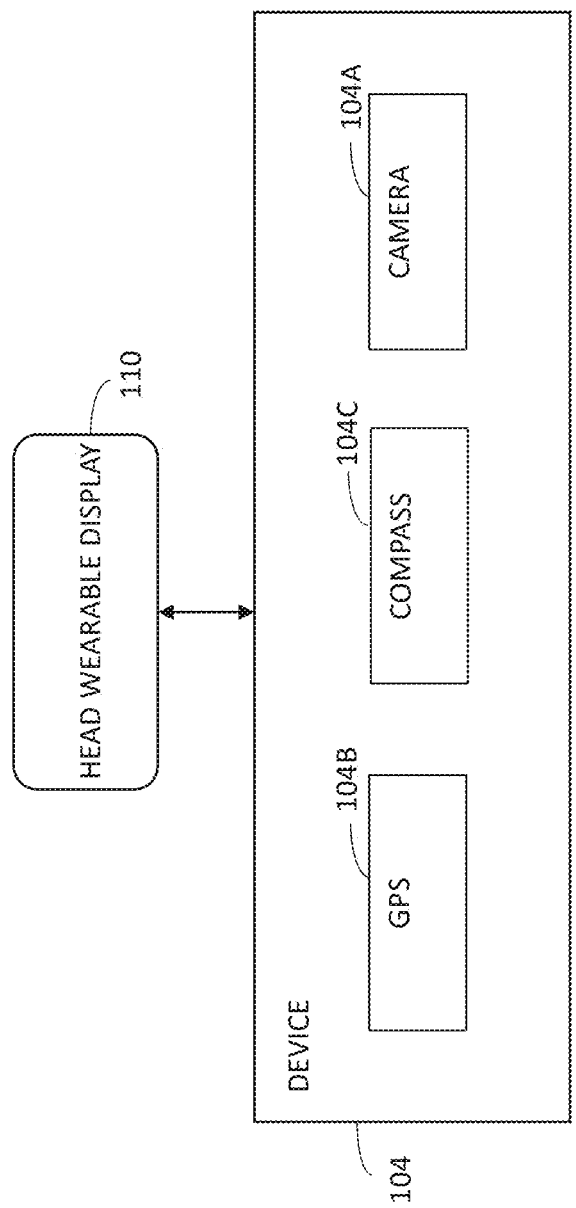
Figure 1C:
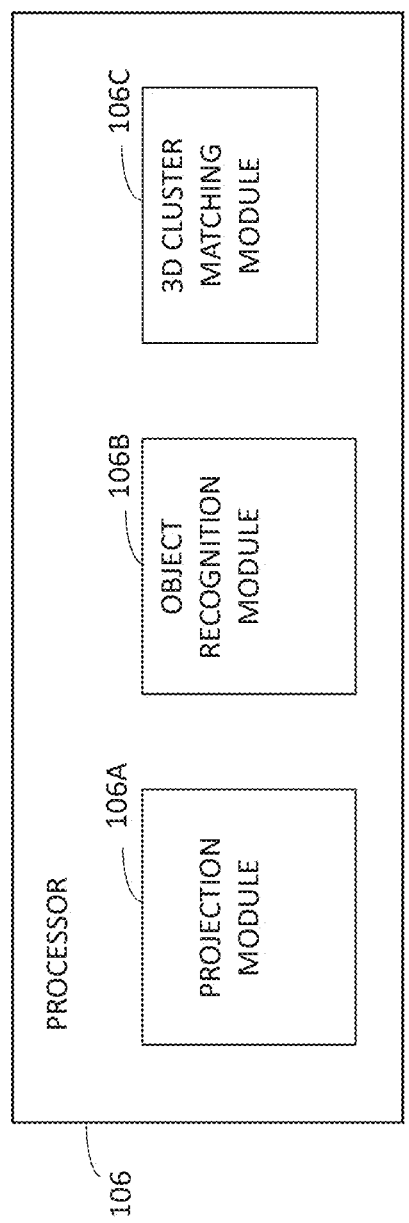

Reference is now made to FIGS. 1A-1C which show a system for identifying multiple objects in a three-dimensional scene, in accordance with an embodiment. Multiple objects 100 may be positioned or installed at a site. For example, objects 100 may be instruments, such as filters, pressure gauges, and pressure transmitters, installed as a water treatment plant. The objects may require servicing, such as periodic adjusting, maintenance, repairs and supervision by an on-site operator. The site may include multiple instances of the same type of object 100, such that visually identifying a particular instance of an object may be non-trivial. Each object 100 may be assigned a unique identifier (ID). A storage device 102 may maintain a database that stores information about each object 100 indexed according to the unique IDs. For example, such information may include the spatial configuration of each object relative to a global, or absolute coordinate system of the site, such as its location, position and orientation, its maintenance schedule, operational parameters and settings, warranty and safety information, and the like. The information pertaining to any of objects 100 may be obtained by querying the database 102 with the unique ID of the object.

An operator may identify objects 100 using a mobile device 104 configured with a camera 104a, shown in the block diagram of FIG. 1B. Device 104 may be provided with one or more components for identifying a viewing direction, and for measuring the position and/or orientation of camera 104a, such as a global positioning system (GPS) 104b, compass 104c, and the like. These components may have known measurement and/or calibration errors which may be accounted for in any of the subsequent spatial configuration calculations. The operator may capture one or more images of objects 100 installed at the site using camera 104a. Device 104 may provide at least one of the captured images to processor 106 configured with an object identification module 106a together with the information indicating its location and orientation at the time that the image was captured as well as any error. Processor 106 may be configured with device 104 or alternatively may be accessible to device 104 via network 108, using any known communications means, such as but not limited to infrared wireless, WiFi, Bluetooth, satellite communication, broadcast radio, Microwave radio, Zigbee and the like.

Referring to FIG. 1C, a block diagram of processor 106 is shown, including a projection module 106a, an object recognition module 106b, and a three-dimensional (3D) Cluster Matching module 106c. This configuration is not meant to be limiting, thus any of modules 106a, 106b, and 106c may be distributed among any number of processors configured either locally with device 104, or alternatively configured in communication with camera 104 via network 108.

Projection module 106a may use the location, orientation and/or error information received from device 104 to create a 3D model of the site that includes multiple object instances that are expected to be positioned in proximity to camera 104a. To implement this, projection module 106a may use the location, orientation and/or error information received from device 104 to compute an absolute location, an absolute orientation and an absolute viewing area of camera 104a, each relative to the global coordinate system of the site. Projection module 106a may identify and retrieve those objects stored in the database 102 that are expected to be positioned inside the absolute viewing area according to their stored spatial configurations.

Projection module 106a may use the retrieved expected objects to create the 3D model of the site including the expected object instances positioned in accordance with their defined spatial configurations relative to the global coordinate system of the site. Projection module 106a may generate multiple candidate clusters of the expected object instances, where each candidate cluster represents a different projection of the 3D model, corresponding to a different perspective or viewing angle of expected object instances. For example, projection module 106a may include perspective views from within a 10 meter (m) radius of the position of the operator. Each candidate cluster may include at least two of the expected object instances, such that the distance(s) between the object instances in each candidate cluster differs according to the viewing angle.

Object recognition module 106b may analyze the received image using any suitable object recognition algorithms, such as but not limited to edge detection, image segmentation, color, shape and/or texture correction and comparison algorithms, and detect any of the objects captured in the image. Optionally, at least two objects are detected such that the position and orientation differences between them may be determined. The detected objects may be compared against the object types stored in the storage device 102 and each detected object's type may be identified. For example, three detected objects may be identified as pressure transmitters, and one detected object may be identified as a pressure reducer. Object recognition module 106b may determine the spatial configuration for each detected object, such as its orientation and estimated 3D position, as well as the 3D spatial distances between any two detected objects. The spatial configurations of detected objects may be determined with respect to the camera's coordinate system. For example, the rotation may be determined as a three degree of freedom (3-DOF) deviation from the camera's defined vertical axis.

Optionally, the identified object type may be used by projection module 106a when generating the candidate clusters, such as to ensure that each candidate cluster includes at least one instance of one of the identified object types.

3D Cluster Matching module 106c may use any of the object type and spatial configurations to match detected objects to one of the candidate clusters. 3D Cluster Matching module 106c may determine a 3D transform between the spatial orientations of the detected objects and the expected object instances of each candidate cluster, and may estimate a transform error for each candidate cluster. The candidate cluster with the minimal transform error may be selected as having the best fit, or most probable cluster, and may be matched to detected objects.

The detected image objects may be associated with the expected object instances of the matched cluster. Optionally, the matched cluster may be provided as feedback to object recognition module 106b which may use it to refine the detection of the objects and correct for detections that were previously missed, and/or false positive detections. The above process may be reiterated any number of times to refine the detection and associations between the detected objects and the expected object instances of the clusters.

3D Cluster Matching module 106c may retrieve information associated with any of the detected object instances by querying database 102 with the ID of their associated expected objects, and may provide this information to the operator, such as by displaying the information on a head-wearable display 110 worn by the operator. For example, the head-wearable display may be an augmented reality (AR) display, allowing the operator to view the site through the device while simultaneously viewing the displayed information. As objects are identified, their information, such as operational settings or alerts may be displayed to the operator, allowing him to identify each of the objects and service them accordingly. The identification may be automatic, precluding the need for providing any identifying tags with any of the objects. The object type, position, and orientation relative to the other objects nearby may be sufficient for uniquely identifying any specific object.

Optionally, display 110 may be a virtual reality (VR) display. In this case, a stream of images, such as a video, may be captured by camera 104a and displayed in real-time on display 110.

Optionally, a user interface may be provided to allow the operator to select any one of the detected objects. In response to the selection, data store 102 may be queried with the ID of the expected object instance that is associated with the selected object, and the information retrieved by the query may be rendered on virtual reality display 110.

Figure 2A:
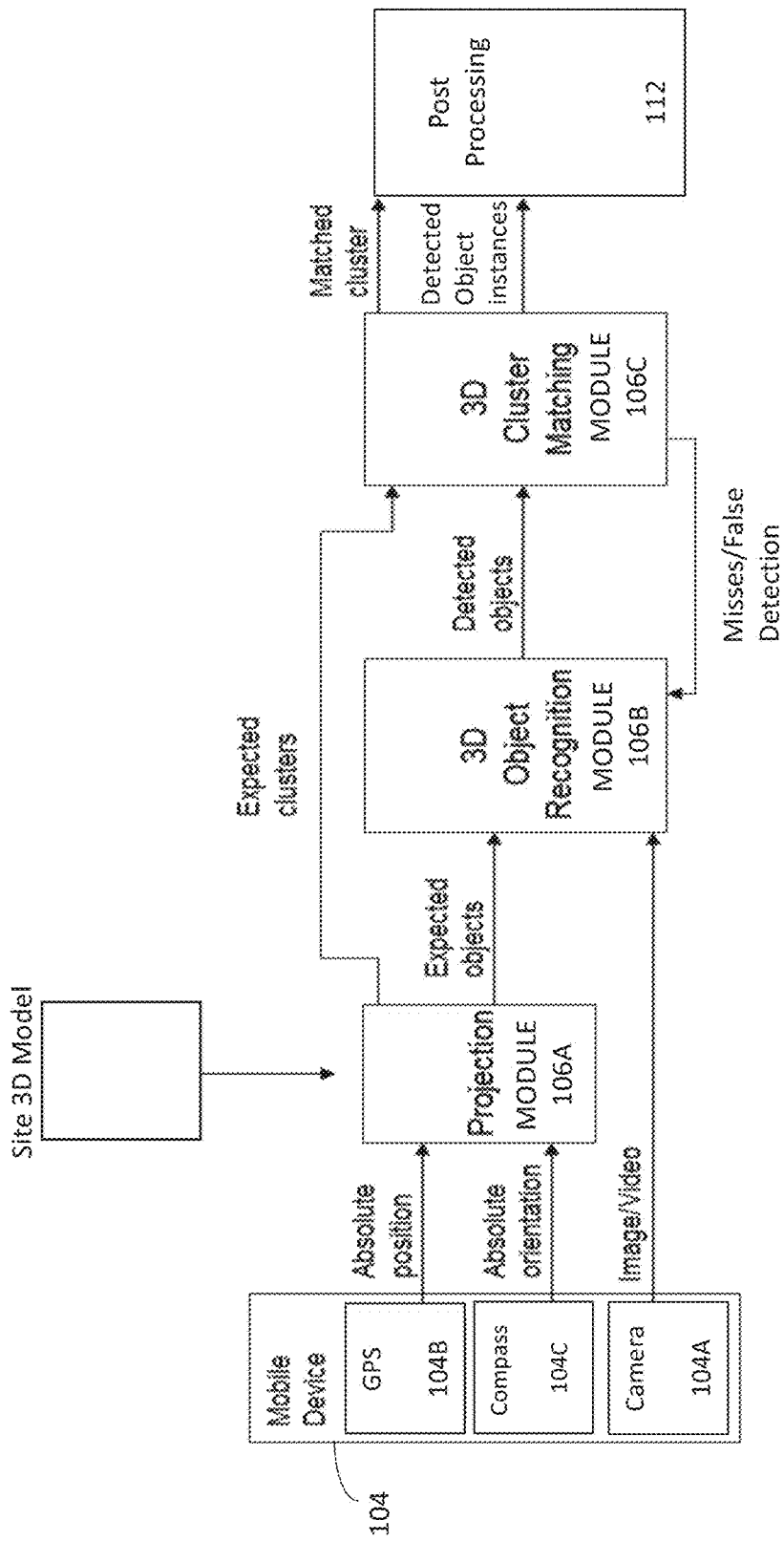
FIG. 2A shows a block flow diagram of the system of FIGS. 1A-1C.

Reference is now made to FIG. 2A which shows a block flow diagram of the system described above with respect to FIGS. 1A-1C. Images captured by camera 104a are provided to object recognition module 106b which processes the images to detect multiple objects. Location and orientation information of camera 104a provided by GPS 104b and compass 104c are provided to projection module 106a, which retrieves a 3D information of the site in the general proximity of camera 104a. Projection module 106 uses the retrieved 3D information to create a 3D model of the site including multiple instances of objects expected to be in the vicinity of camera 104a. Projection module 106 creates multiple clusters, each corresponding to a different projection of the 3D model and provides the clusters to 3D cluster matching model 106c. Additionally, projection module provides the expected object type to 3D object recognition module 106b which uses the type to detect and recognize the objects captured in the image. The detected objects and the clusters may be provided to the 3D cluster matching module 106c, and the most probable cluster with the lowest transform error may be selected and matched to the detected objects. The matched cluster may be provided as feedback to 3D object recognition module 106b to allow for refining the detection of the objects, and discover previously undetected objects and/or false positive detections. The detected objects may be matched to the expected object instances, and provided to a post-processing unit 112.

Figure 2B:
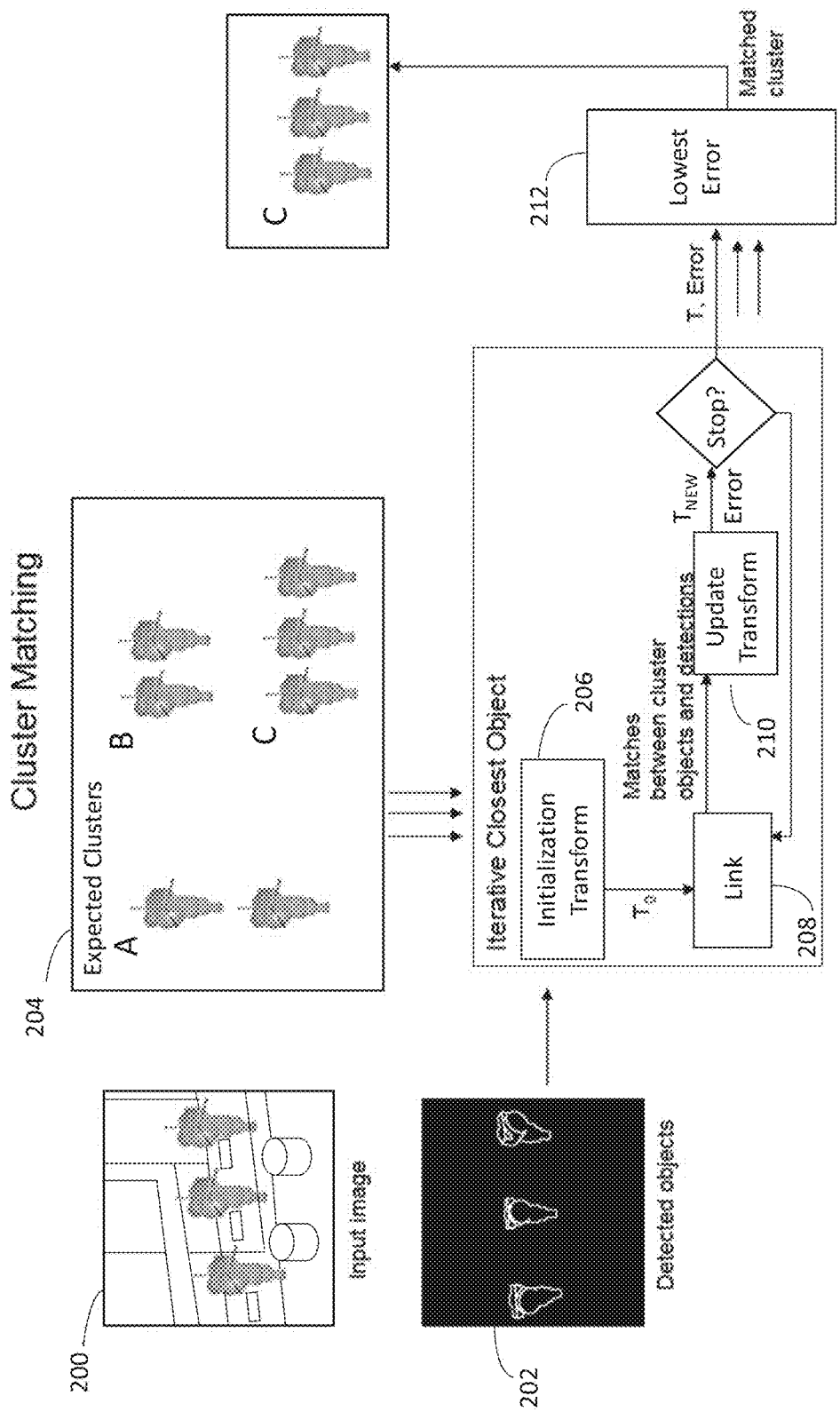
FIG. 2B shows a detailed view of a cluster matching algorithm, in accordance with an embodiment.

Referring to FIG. 2B, a detailed view of the cluster matching method is shown. An image 200 is received and three objects are detected by object recognition module 106b, shown as objects 202. Cluster matching module 106c compares detected objects 202 to three different clusters 204 created by projection module 106a and estimates the transformation between the spatial configurations of the detected objects in the camera's coordinate system to the spatial configurations of the expected object instances in the candidate clusters relative to the global coordinate system. Optionally, this is accomplished using a variation of the Iterative-Closest-Point (ICP) algorithm, or the Iterative-Closest-Object, and which works as follows:

First, an initial transform T0 is computed based on a single match between the spatial configuration of a detected object and a similar expected object instance in one of the clusters (206).

Based on T0, a linkage is created between all detected objects and expected object instances of the cluster. To account for missed detections and false-positive detections, there is no requirement to link all the expected object instances of the cluster to the detected objects (208).

Based on the linkage, the transform may be refined to obtain a more accurate estimate, using the feedback described above (210).

In addition, the transform error is computed as a function of the difference in position and orientation between the estimated object instances of the cluster, after applying the transform, and the detected objects.

The above steps may be repeated over multiple iterations. For each iteration, if the error is reduced compared to the previous error, a new linkage is made, and the transform is further refined. Otherwise, a local minimum of the error is reached, and the process is concluded.

The output of the Iterative-Closest-Object is the best matching cluster with the smallest transform error, the last transform, and its respective error (212).

Figure 3A:
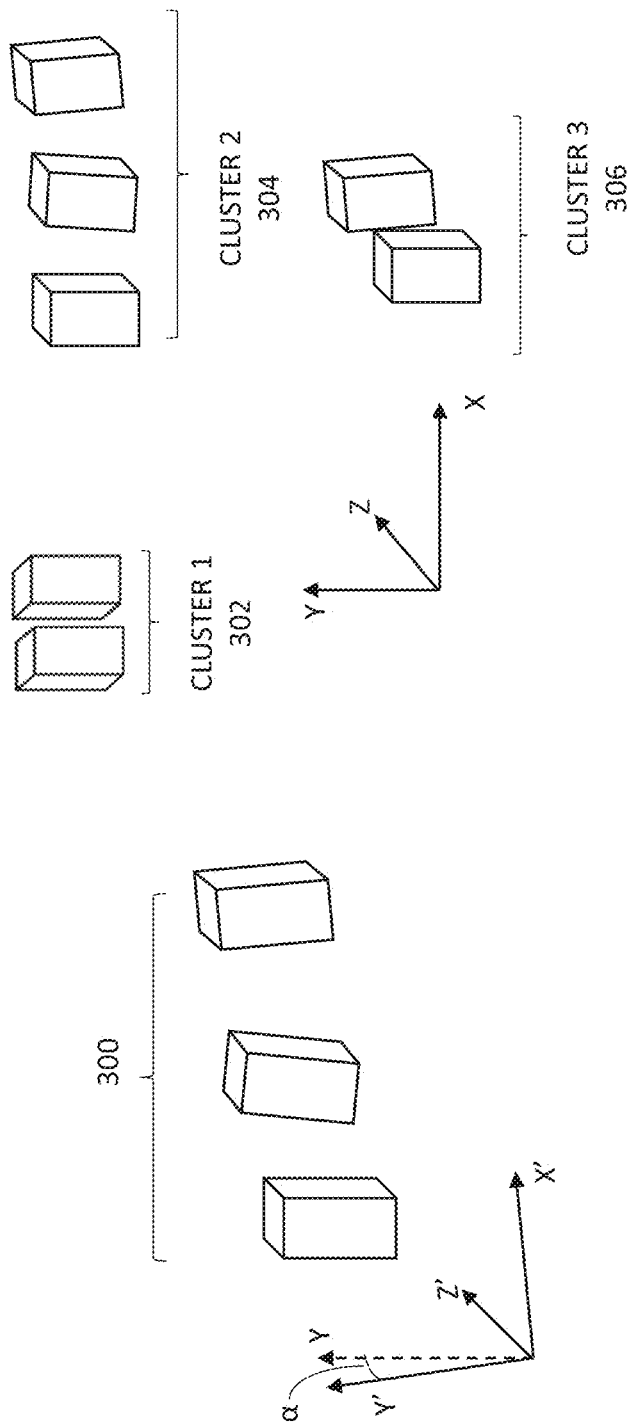
FIGS. 3A-3D, taken together, show an exemplary implementation of the system of FIGS. 1A-1C and 2A-2B.

Reference is now made to FIGS. 3A-3D which show an exemplary implementation of the system and method described above. Referring to FIG. 3A, three objects 300 detected by 3D Object Recognition module 106b are shown with estimated spatial configurations relative to the camera coordinate system, labeled (X', Y', Z'). Projection module 106a uses the location of camera 104 to create three candidate clusters 302, 304, and 306 of expected object instances. Clusters 302, 304, and 306 include the same objects, but with different geometric configurations, defined relative to the global axes of the site (X, Y, Z). The discrepancy between the camera coordinate system and the global coordinate system is indicated in FIG. 3A as angle α.

Figure 3B:
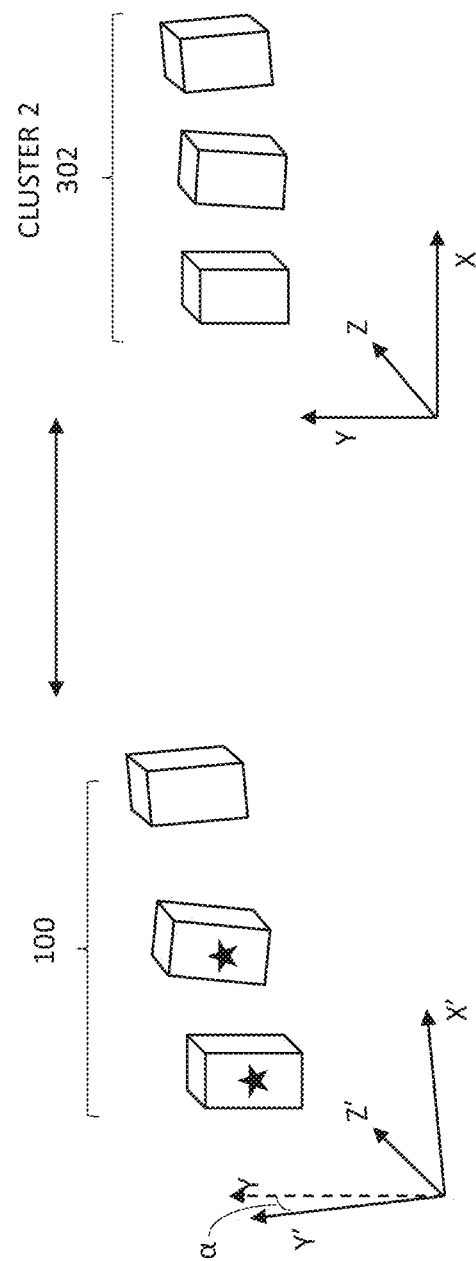

Referring to FIG. 3B, only two of three objects are detected by object recognition module 106b, these are indicated by the stars. Cluster matching module 106c finds the best match between the detected objects 300 and one of the candidate clusters 302, 304, and 306 by estimating a 3D transform between the detected objects and the expected object instances of each candidate cluster, and computing the error of the transform. The candidate cluster having a transform with the minimal error is selected as the matching cluster. In this case, the best match is cluster 304.

Figure 3C:
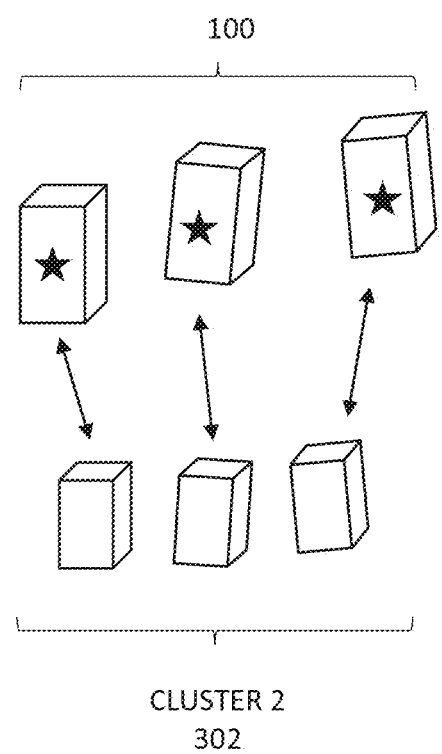

Referring to FIG. 3C, the matched cluster is fed back to object recognition module 106b which uses it to detect the third object that was not previously detected, thus all three objects captured are detected, indicated by the three stars, and associated with the expected object instances of the cluster, indicated by the three arrows.

Figure 3D:
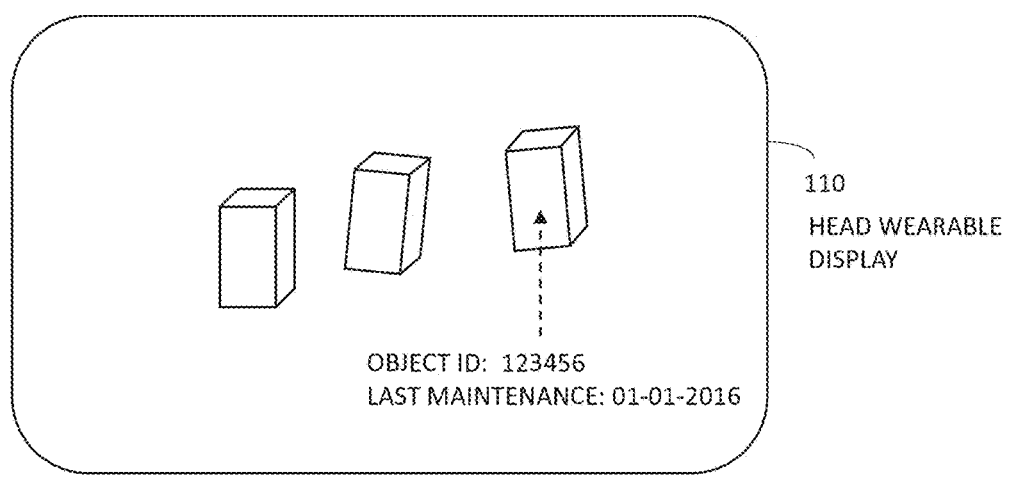

Referring to FIG. 3D, head wearable display 110 shows the scene viewed by the operator. The viewed scene may be the real scene viewed through a clear viewing interface if display 110 is an AR display, alternatively, it may be a rendered video of the scene if display 110 is a VR display. In addition to viewing the scene, information pertaining to one of the detected objects appears in display 110. In this case, the object was not initially detected by object recognition module 106b. However, by comparing the spatial configuration of the other objects nearby to the spatial configuration of objects expected to be in the general locations, the third object is detected and associated with its corresponding object instance in the database, allowing information regarding its operation to be displayed. The detected object is shown with its ID: 123456, and its last maintenance date.

Figure 4A:
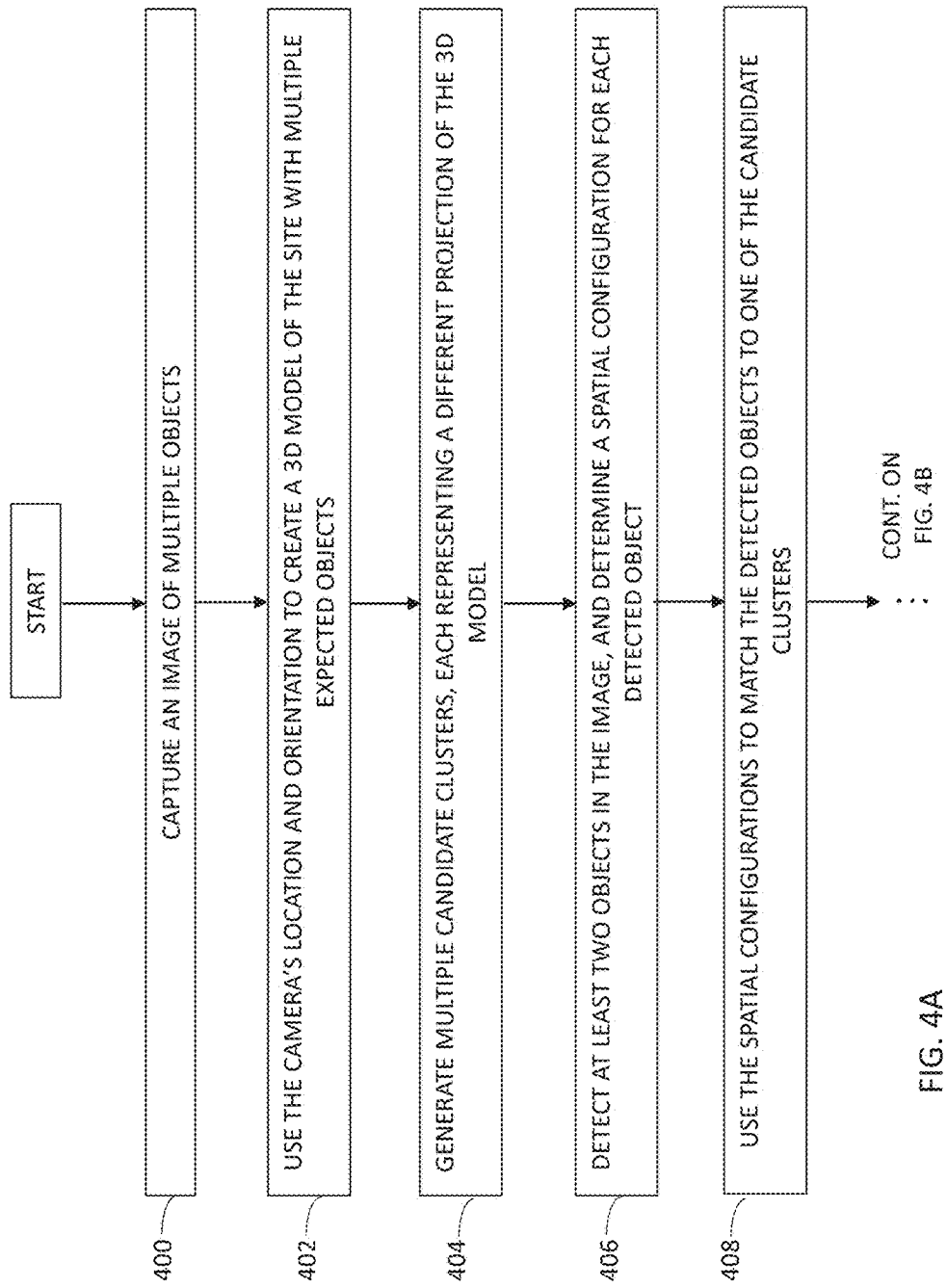

Reference is now made to FIGS. 4A-4B which, taken together, show a flowchart of a method for recognizing an object according to its three dimensional (3D) spatial configuration, in accordance with an embodiment.

An image may be captured of multiple objects at a site (Step 400). The location and orientation of the camera may be used to create a 3D model of the site, including multiple instances of objects expected to be in proximity to the camera (Step 402). For example, the camera location and orientation may include any of a global positioning system (GPS) measurement, and a compass measurement, and may be used to compute any of: an absolute location, an absolute orientation, and an absolute viewing area of the camera, each relative to a global coordinate system. Each expected object instance may be identified according to its spatial configuration relative to the absolute viewing area of the camera with respect to the global coordinate system. Multiple candidate clusters, each representing a different projection of the 3D model, may be generated (Step 404). Each candidate cluster may include a different spatial configuration for at least some of the expected object instances relative to the projected perspective.

At least two objects may be detected in the image and a spatial configuration relative to the coordinate system of the camera may be determined for each detected object (Step 406). The spatial configurations may be used to match the detected image objects to one of the candidate clusters (Step 408).

The spatial configurations may include an orientation and an estimated 3D position for each of the expected and detected objects, and a spatial distance between any two detected objects and between any two expected object instances. The detected objects may be matched to the cluster in accordance with a minimal estimated 3D transformation error between the spatial configurations of the detected objects relative to a coordinate system of the camera and the spatial configurations of the expected object instances relative to the global coordinate system.

The detected objects may be associated with the expected object instances of the matched cluster (Step 410). Additionally, the matched cluster may be used to refine the detection of the objects in the image and correct any of: a missed detection, and a false positive detection. Information stored with one of the expected object instances may be retrieved (Step 412), such as by querying for the expected object instance using the expected object instance's identifier. The retrieved information may be rendered to indicate the detected object instance that is associated with the queried expected object instance (Step 414). For example, the information may be displayed on a head wearable display, such as an AR or VR display. Optionally, a selection of one of the detected objects may be received, and the retrieved information may be associated with the selected object instance and displayed.

It may be appreciated that the system and method disclosed herein allows for identifying similar objects without requiring tags to be deployed or read, and thus does not require the infrastructure required to maintain a system of tags to be deployed and maintained, reducing both cost and complexity. This proposed system does not require laser scanning and/or post-annotation of object ID tags during installation, and allows changes to be made at the site at lower cost and overhead. The system may be implemented using mobile devices with low computation cost. Further-more, the system may be robust to errors since allowing for incorrectly detected objects to be recognized according to their spatial configuration.

Figure 5:
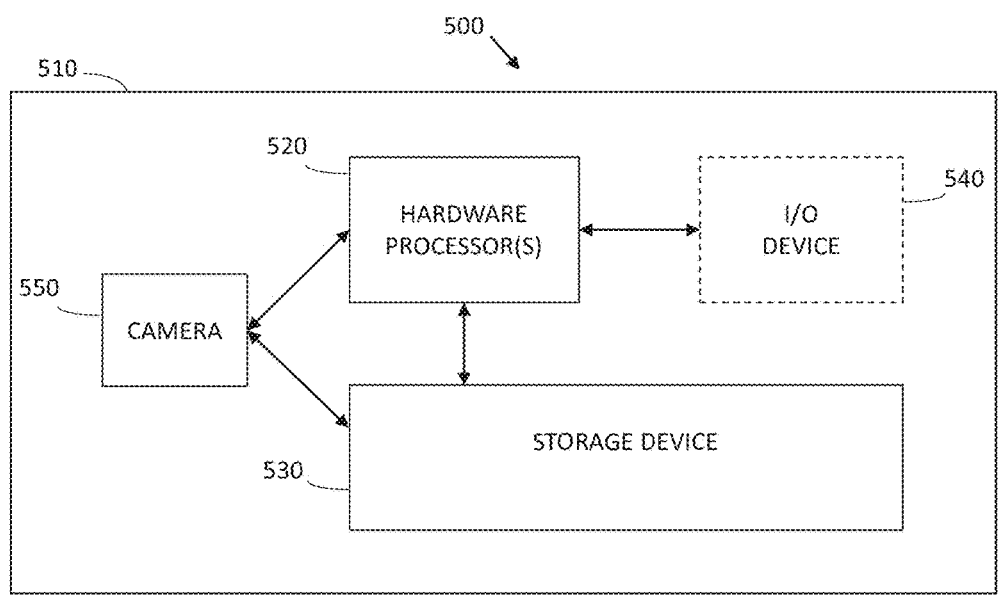
FIG. 5 shows an exemplary system according to an embodiment.

Reference is now made to FIG. 5, which shows an exemplary system 500, according to an embodiment. System 500 may include a computing device 510. Computing device 510 may include a hardware processor 520, a storage device 530, an optional input/output ("I/O") device 540, and optionally a digital camera 550. Hardware processor 520 may include one or more hardware processors, storage device 530 may include one or more storage devices and I/O device 540 may include one or more I/O devices, camera 550 may include one or more optical components. Hardware processor 520 may be configured to execute any of the steps of described above. I/O device 540 may be configured to provide and/or receive a data stream, and allow a user to interact with system 500. Dedicated software, implementing the methods discussed above, may be stored on storage device 530 and executed by hardware processor 520.

In some embodiments, computing device 510 may include an I/O device 540 such as a terminal, a display, a keyboard, a mouse, a touch screen, a microphone, an input device and/or the like, to interact with system 500, to invoke system 500 and to receive results. It will however be appreciated that system 500 may operate without human operation and without I/O device 540.

In some exemplary embodiments of the disclosed subject matter, storage device 530 may include and/or be loaded with code for a user interface. The user interface may be utilized to receive input and/or provide output to and from system 500, for example receiving specific user commands and/or parameters related to system 500, providing output, or the like.

In some embodiments, camera 550 may be controllable and/or operable by hardware processor 520. Images captured by camera 550 may be stored at storage device 530 and accessible to processor 520 for processing and/or display at I/O 540.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the market site, or to enable others of ordinary skill in the art to understand the embodiments disclosed herein.

What is claimed is:

1. A system for identifying object instances in a three-dimensional (3D) scene, comprising:
   a camera configured to capture an image of multiple objects at a site;
   at least one hardware processor; and
   a non-transitory memory device having embodied thereon program code executable by said at least one hardware processor to:
      receive, from said camera, a captured image that depicts multiple objects that are physically present at the site,
      detect at least two objects in the image,
      retrieve 3D information of the site, wherein the 3D information comprises location and orientation of objects that have been previously determined to be located at the site,
      generate, based on the 3D information of the site, multiple candidate clusters of objects that have been previously determined to be located at the site and are of the same type as the detected objects, wherein each of the candidate clusters represents a different relative spatial configuration between the objects in the respective candidate cluster,
      determine a spatial configuration of the objects detected in the image, with respect to each other and to said camera,
      match the objects detected in the image to one of the multiple candidate clusters, by:
         (a) calculating a 3D transform error between the spatial configuration of (i) the objects detected in the image and (ii) the objects on the respective candidate cluster, and
         (b) selecting a candidate cluster with a minimal 3D transform error as a most probable cluster,
      associate the objects detected in the image with the objects of the most probable cluster, and
      retrieve information of at least one of the objects of the most probable cluster.

2. The system of claim 1, wherein the program code is further executable by said at least one hardware processor to display the retrieved information.

3. The system of claim 2, further comprising a head-wearable display selected from the group consisting of: an augmented reality display, and a virtual reality display, wherein the displaying of the retrieved information is on the head-wearable display.

4. The system of claim 3, wherein one or more of the at least one hardware processors are disposed with the head-wearable display.

5. The system of claim 3, wherein the camera is disposed with the head-wearable display.

6. The system of claim 2, further comprising a user interface configured to receive a selection of one of the objects detected in the image, wherein the displayed retrieved information is associated with one of the objects of the most probable cluster which corresponds to the selected object.

7. A method for identifying multiple object instances, comprising:
   capturing, by a camera, an image depicting multiple objects that are physically present at a site;
   detecting at least two objects in the image;
   retrieving three-dimensional (3D) information of the site, wherein the 3D information comprises location and orientation of objects that have been previously determined to be located at the site;
   generating, based on the 3D information of the site, multiple candidate clusters of objects that have been previously determined to be located at the site and are of the same type as the detected objects, wherein each of the candidate clusters represents a different relative spatial configuration between the objects in the respective candidate cluster;
   determining a spatial configuration of the objects detected in the image, with respect to each other and to said camera;
   matching the objects detected in the image to one of the multiple candidate clusters, by:
      (a) calculating a 3D transform error between the spatial configuration of (i) the objects detected in the image and (ii) the objects in the respective candidate cluster, and
      (b) selecting a candidate cluster with a minimal 3D transform error as a most probable cluster;
   associating the objects detected in the image with the objects of the most probable cluster; and
   retrieving information of at least one of the objects of the most probable cluster.

8. The method of claim 7, further comprising displaying the retrieved information.

9. The method of claim 8, further comprising receiving a user selection of one of the objects detected in the image, wherein the displayed retrieved information is associated with one of the objects of the most probable cluster which corresponds to the selected object.

10. A computer program product comprising a non-transitory computer-readable storage medium having program code embodied thereon, the program code executable by at least one hardware processor to:

receive, from a camera, a captured image that depicts multiple objects that are physically present at a site;

detect at least two objects in the image;

retrieve 3D information of the site, wherein the 3D information comprises location and orientation of objects that have been previously determined to be located at the site;

generate, based on the 3D information of the site, multiple candidate clusters of objects that have been previously determined to be located at the site and are of the same type as the detected objects, wherein each of the candidate clusters represents a different relative spatial configuration between the objects in the respective candidate cluster;

determine a spatial configuration of the objects detected in the image, with respect to each other and to the camera;

match the objects detected in the image to one of the multiple candidate clusters, by:

(a) calculating a 3D transform error between the spatial configuration of (i) the objects detected in the image and (ii) the objects in the respective candidate cluster, and (b) selecting a candidate cluster with a minimal 3D transform error as a most probable cluster;

associate the objects detected in the image with the objects of the most probable cluster; and retrieve information of at least one of the objects of the most probable cluster.

11. The computer program product of claim 10, wherein the program code is further executable to display the retrieved information.

12. The computer program product of claim 11, the program code is further executable to receive a user selection of one of the objects detected in the image, wherein the displayed retrieved information is associated with one of the objects of the most probable cluster which corresponds to the selected object.

13. The method of claim 8, wherein the displaying of the retrieved information is on a head-wearable display selected from the group consisting of: an augmented reality display, and a virtual reality display.

14. The method of claim 13, wherein the camera is disposed with the head-wearable display.

15. The computer program product of claim 11, wherein the displaying of the retrieved information is on a head-wearable display selected from the group consisting of: an augmented reality display, and a virtual reality display.

16. The computer program product of claim 15, wherein the camera is disposed with the head-wearable display.

* * * * *